July 21, 1959     R. C. LEDERER     2,895,504
COMBINED RELIEF VALVE AND LOW PRESSURE INDICATOR
Filed July 8, 1957
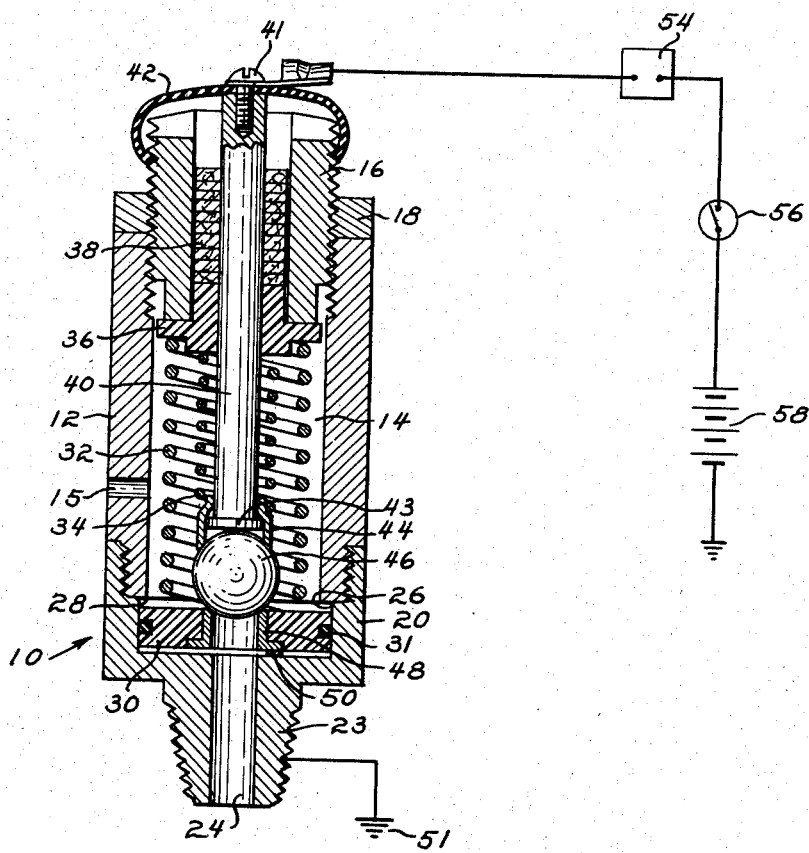
INVENTOR
ROBERT C. LEDERER
BY *Scrivener & Parker*
ATTORNEYS

United States Patent Office 2,895,504
Patented July 21, 1959

2,895,504

COMBINED RELIEF VALVE AND LOW PRESSURE INDICATOR

Robert C. Lederer, Berkeley, Calif., assignor to Bendix-Westinghouse Automotive Air Brake Company, Elyria, Ohio, a corporation of Delaware Application July 8, 1957, Serial No. 670,556

5 Claims. (Cl. 137—539)

This invention relates to pressure indicators and safety relief valves for fluid pressure systems and more particularly to a low pressure indicator and a relief valve which are combined in a single unit either to relieve excessive high pressure in a fluid pressure system or to indicate when the pressure has fallen to a predetermined low value.

In fluid pressure systems a safety relief valve is provided usually in the first main reservoir and it is presently a requirement of law that in fluid brake systems a relief valve must be located in this position in the system. It is also a requirement of law that a low pressure indicator be provided but since there is no requirement as to its location the low pressure indicator is usually installed in any convenient pressure line with the location varying from system to system. In brake systems which use both a safety relief valve and a low pressure indicator not only is there extra expense involved for the separate units and fittings but also extra time is required to service the units with the low pressure indicator frequently being neglected due to non-uniform location in individual systems.

It is a prancipal object of the present invention to eliminate the disadvantages of separate relief valves and low pressure indicators by combining these two devices in a single unit which performs the function of both.

A more specific object of the invention is the provision of a combined low pressure indicator and a high pressure relief valve wherein the low pressure is indicated by an electrical signal and excess high pressure is relieved by the unseating of a loaded relief valve but wherein neither function can interfere in any way with the operation of the other.

Other objects of the invention are the provision of a combined low pressure indicator and relief valve to permit standardized location of these units in every pressure system; to insure simultaneous inspection, servicing and repair of both the indicator and the valve; and eliminate extra expense of separate installation, fittings, and units.

Other objects and their attendant advantages will become apparent as the following description is read in conjunction with the accompanying drawing wherein the single figure is a vertical cross-section of the unit of the invention.

Referring now to the drawing, the combined low pressure indicator and relief valve assembly is designated by the numeral 10 and comprises a hollow cylindrical body member 12 forming a relief cavity 14 having a vent 15 through the side thereof and whose upper end is closed by a threaded hollow screw-like member 16 which may be locked in position by means of a lock-nut 18. The lower end of body member 12 is exteriorly threaded to receive a bottom closure member 20 which is provided with a suitable threaded nipple 23 having a central passage 24 therein for connecting the device of the invention to a part of the pressure system under main reservoir pressure, preferably to the main reservoir itself. The bottom member 20 is counterbored to provide a recess 26 having a diameter greater than that of the cavity 14 whereby the bottom edge of the body member 12 provides a shoulder 28 serving as an upper stop for a piston-like member 30, composed of insulating material such as hard rubber or the like, and is provided with a seal ring 31 to insure a fluid-tight fit with the recess 26.

The piston 30 serves as the operating member of the low pressure indicator and as such it is exposed to main reservoir pressure through the passage 24. In the drawing, the piston 30 is in its low-air or indicating position and its upward movement is resisted by the combined efforts of an outer spring 32 and an inner or relief spring 34 whose upper ends engage an insulated bushing 36 which bears on the lower end of closure 16 and provides, with a suitable member of insulating washers 38, an insulated guide for a reciprocal plunger 40 whose upper end carries an electrical connector 41 and a flexible boot 42 which serves as a dirt and moisture shield. The lower end 43 of plunger 40 is flanged to receive a ball valve guide 44 upon which the lower end of inner spring 34 bears to force a ball type relief valve 46 onto a seat provided by the upper end of a hollow metallic bushing 48 concentrically disposed in the insulating piston 30. The lower end of bushing 48 is preferably flanged as illustrated and this flange, when the piston is in the down position of the drawing, engages an electrical contact 50 which serves to complete, from ground 51, an electrical circuit which includes serially: the bushing 48, ball valve 46, plunger 40, upper connector 41, an indicator 54, a switch 56 and an electrical source 58. The contact 50 spaces the piston 30 slightly above the bottom of recess 26 to permit ready access of reservoir pressure to the under side of the piston.

In operation, with the parts in the no-air position of the drawing, when the switch 56 is closed, indicator 54, which may be a light, bell, buzzer or other alarm, is energized. As the pressure in the main reservoir builds up to a predetermined minimum, say 60 p.s.i., the total force exerted on the relatively large area of the piston 30 is sufficient to move its upwardly against the combined force of the springs 32 and 34. As the piston moves away from the contact 50, the indicator circuit is broken to stop the alarm. If the pressure continues to rise, the piston continues its upward movement until it contacts the shoulder 28. For normal operating pressures, the piston may remain against the shoulder 28 or may occupy intermediate positions in the recess 26 depending upon the degree of normal pressure. However, should the pressure continue to rise above a maximum normal, say, to above 150 p.s.i., the piston seats on the shoulder 28 and the excessive pressure acting on the relatively small area of the ball valve 46 unseats it against its spring 34 to permit the excessive pressure to be relieved into the relief cavity 14 and thence to atmosphere through the vent 15. When normal pressure conditions are restored in the system, the ball valve seats and as long as the pressure exceeds the minimum normal of, say, 60 p.s.i. so that bushing 48 remains out of engagement with contact 50, the ball valve 46 operates in the usual manner as a relief valve without any effect on the low pressure indicator circuit. Whenever the reservoir pressure falls below 60 p.s.i., the piston 30 is moved by springs 32 and 34 to the position of the drawing where the bushing 48 engages the contact 50 to complete the indicator circuit and energize the alarm 54. Since the pressure at which the piston 30 seats in its lower position is far below the unseating pressure of valve 46, it will be apparent that this member must remain in sealing contact with bushing 48 to serve only as an electrical conductor when the piston 30 is functioning as a low pressure indicator. The seating and unseating pressures for the valve and the piston are determined by spring selection and by adjustment of the screw member 16 for pre-loading the springs to effect desired operation. If desired a single spring for the relief valve can serve to load both the piston and the valve. The valve 46 has been shown and described as a ball valve. It will be apparent that other types of valves would be within the scope of the invention. The term "contact" should be understood to include any suitable switch means. It will also be apparent that the invention can be utilized in various types of fluid pressure systems and should not be thought of as necessarily restricted to a brake system, though its use in brake systems is particularly advantageous from the point of view of inspection, servicing, eliminating costly extra fittings and parts, and insuring a location in all brake systems which is uniform and in full compliance with present law. It will of course be apparent that the device of the invention is susceptible of various modifications and changes without, however, departing from the scope and spirit of the appended claims.

What is claimed is:

1. A combined low pressure indicator and relief valve for a fluid pressure system comprising a casing having an inlet passage and a pressure responsive element having one side exposed to pressure in the inlet passage and being movable between first and second positions, spring means for retaining said pressure responsive element in its first position until the pressure in said inlet passage is above a predetermined low pressure whereupon said element is moved towards said second position, an electrical circuit including an indicator connected to said pressure responsive element, switch means in said circuit closed by said pressure responsive element when in its first position to complete said circuit and energize said indicator, said switch means being opened to break said circuit whenever said element is moved towards said second position, and a relief valve carried by said element and exposed to the pressure in said inlet passage, said valve being spring-loaded to closed position and opening to relieve the pressure in said inlet passage only when the pressure exceeds a predetermined high pressure and when said element has moved from its first position to break said circuit.

2. A combined low pressure indicator and relief valve for a fluid pressure system comprising a casing having an inlet passage and a pressure responsive element having one side exposed to fluid pressure in the inlet passage and being movable between a first position and a second position, spring means normally resisting movement of said element from said first position until a greater than predetermined low pressure exists in said inlet passage, electric conducting means extending from one side to the other of said element, an electric contact engaged by one end of said conducting means when said element is in its first position, an electrical circuit including indicator means connected to the other end of said conducting means, a relief passage extending through said element, a spring-loaded relief valve normally closing said relief passage and openable to release pressure in said inlet passage only when said pressure exceeds a predetermined high value and only after said pressure has moved said element from its first position out of engagement with said contact so that said circuit is de-energized before said relief valve can open.

3. A combined low pressure indicator and relief valve for a fluid pressure system comprising a casing having an inlet passage and a pressure responsive element having one side exposed to fluid pressure in the inlet passage and being movable between a first position and a second position, spring means normally resisting movement of said element from said first position until a greater than predetermined low pressure exists in said inlet passage, a hollow metallic bushing providing a relief passage extending from one side to the other of said element, an electric contact engaged by said bushing when said element is in its first position, a spring-loaded metallic relief valve closing said relief passage through said bushing, an electrical circuit including indicating means connected to said relief valve, said circuit being completed through said contact and bushing to energize said indicator when said element is in its first position, said relief valve being openable for release of pressure in said inlet passage only when said pressure exceeds a predetermined high value and only after said pressure has moved said element from its first position and the bushing out of engagement with said contact so that said circuit is de-energized before said relief valve can open.

4. A combined low-pressure indicator and relief valve for a fluid pressure system comprising a housing having an inlet and a piston in said housing movable between first and second limits, one side of said piston being subjected to the pressure in said inlet, a metallic bushing providing a relief passage extending through said piston, a metallic relief valve on the non-pressure side of said piston for closing said passage, spring means bearing on said piston and said valve to resist movement of the former until the pressure in said inlet exceeds a predetermined low value and to resist opening of the latter until said pressure exceeds a predetermined high value, an electrical contact engaged by said bushing when said piston is in its first position, an electrical circuit including an indicator connected to said relief valve whereby said indicator is energized through said relief valve and said bushing when the latter engages said contact, said relief valve being openable by said high pressure only after said piston has been moved from its first position away from said contact to de-energize said circuit.

5. A combined low-pressure indicator and relief valve for a fluid pressure system comprising a housing having an inlet and a piston in said housing movable between first and second limits, one side of said piston being subjected to the pressure in said inlet, a relief passage extending through said piston, a metallic relief valve on the non-pressure side of said piston for controlling said relief passage, spring means bearing on said piston and said valve to resist movement of the former until the pressure in said inlet exceeds a predetermined low value and to resist opening of the latter until said pressure exceeds a predetermined high value greater than said low value, electrical conducting means extending through said piston to engage said relief valve when said piston is in its first position, an electrical circuit including indicating means connected to said relief valve, said circuit being completed through said relief valve and said conducting means when said piston is in said first position, said relief valve and said conducting means being moved out of electrical engagement with each other when said piston moves towards its second position and before said relief valve can open to relieve pressure.

References Cited in the file of this patent

UNITED STATES PATENTS

| 842,160 | Aikman | Jan. 29, 1907 |
| 1,365,786 | Kimble | Jan. 18, 1921 |
| 2,260,246 | Woodruff | Oct. 21, 1941 |

FOREIGN PATENTS

| 270,331 | Italy | Jan. 3, 1930 |